United States Patent Office 2,811,852
Patented Nov. 5, 1957

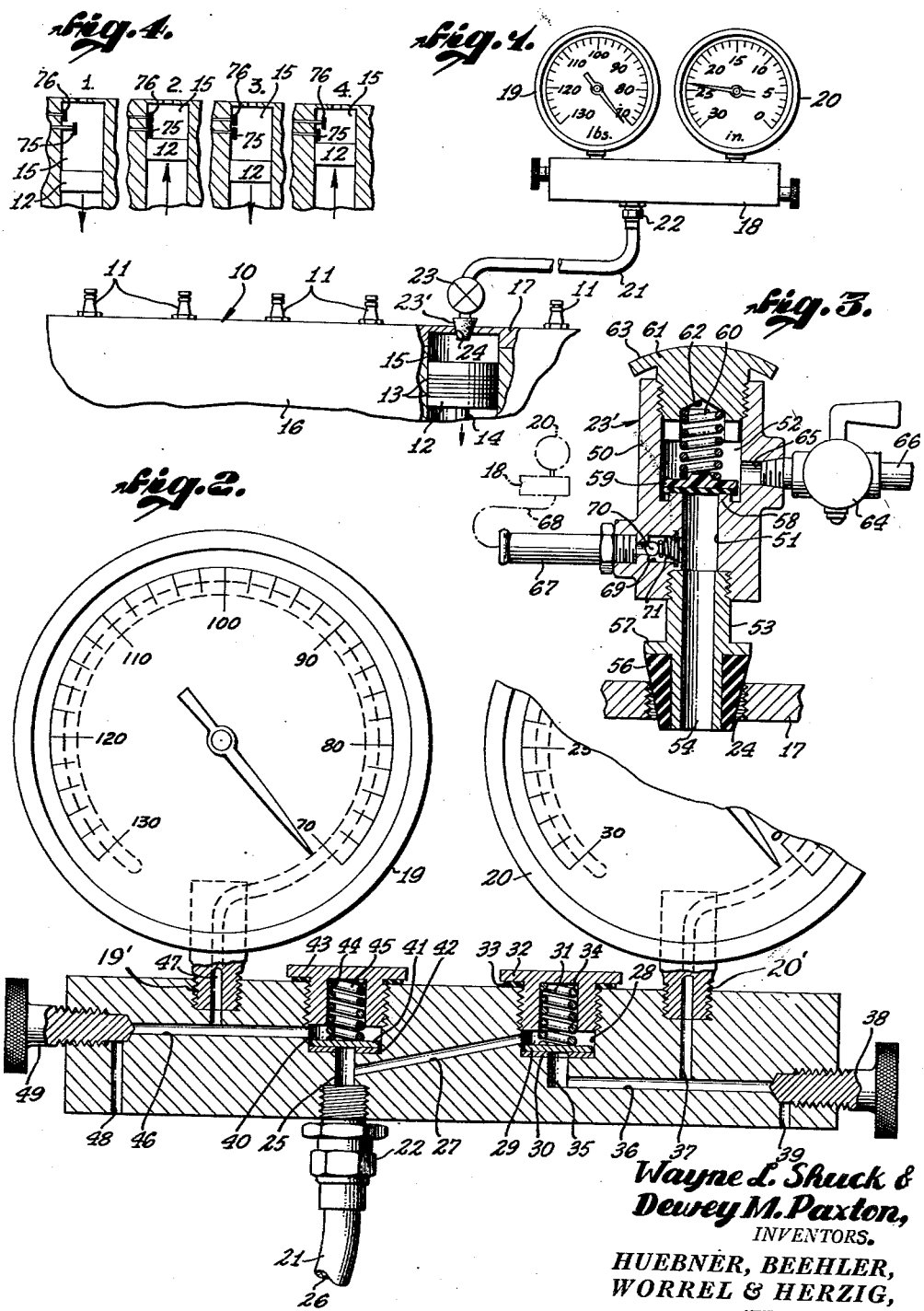

2,811,852

METHOD AND APPARATUS FOR TESTING COMBUSTION ENGINES

Wayne L. Shuck, Los Angeles, and Dewey M. Paxton, South Gate, Calif.

Application November 8, 1954, Serial No. 467,256

10 Claims. (Cl. 73—116)

The invention relates to the art concerning testing means for combustion engines and more particularly is directed to a method and apparatus for employing a vacuum gage to indicate the presence of improperly seating valves and piston rings and other leaks in the combustion chambers of combustion engines.

The most common practice for testing combustion chambers for leaky valves, improperly seating piston rings, engine cracks, and the like, has been to use a pressure gage which is connected successively to the different combustion chambers of the cylinders of the combustion engine to be tested and to determine from a pressure reading on the gage the pressure condition in the combustion chamber at a certain engine cycle. The maximum pressure is taken at the top of the compression stroke of the piston as an indication of the maximum pressure obtainable in that particular cylinder. Certain variations are permissible from the normal expected pressure condition due to inherent variations in the volume of the combustion chamber. This may be due to a high or low tolerance condition, the presence of oil or carbon, or some other factor which may cause the pressure to vary within certain permitted limits. When the pressure is at a figure appreciably less than the permitted variation, it is an indication of a troublesome condition in the combustion chamber. It may mean that one or the other of intake or exhaust valve is not seating properly or it may indicate that the piston rings are not sufficiently tight. Insufficient pressure might also be occasioned by a crack in the engine casing or a leaky gasket. The cylinder head, in any event, will need to be removed and repairs made.

A difficulty, however, in the employment of pressure condition as a test is that the intake and exhaust valves being closed are forced against their seats by the compression of gases in the combustion chamber. This added pressure will help seat the valves under that particular condition but the condition is not representative of pressure normally applied against the valves and they may not be seating properly throughout the normal operation of the engine even though they seat tightly when the compression gage is read. This process further necessitates cranking the engine through a number of revolutions until some representative pressure condition is judged to be the test condition of pressure in the combustion chamber. The over-all result of this form of testing is an undependable, inexact test which cannot be depended upon as an accurate measure of the condition in the combustion chamber. Where by conventional practice the normal vacuum pressure readings are attempted, the reading contemplated was one on the entire engine taken at the intake manifold.

It is therefore among the objects of the invention to provide a new method of effectively using the power stroke of a combustion cylinder to accurately measure the tightness of the combustion chamber and an apparatus for employment of the method by converting the power stroke to a suction or vacuum stroke.

Another object of the invention is to provide a new and improved method for testing combustion chambers in cylinders of combustion engines and apparatus therefor which makes efficient use of the power stroke of the piston by employment of a vacuum gage and suitable connecting means whereby accuracy can be depended upon for accomplishing the results for which the test is employed.

Still another object of the invention is to provide a new and improved method and apparatus therefor which incorporates compensating features for variations in conditions which may be experienced so that the finest pressure condition as measured by the gage will not be thrown off to an unreasonable degree by failure to properly release gas pressure produced by the immediately preceding cycle of the cylinder.

Still further among the objects of the invention is to provide a simple and effective gage mechanism and system which is accurate, effective and of such relatively simple construction that it can be made available at moderate expense to all types of users.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is an elevational view of an apparatus arranged for the practice of the method wherein the combustion chamber of a combustion engine is revealed by a cut-away portion.

Figure 2 is a longitudinal sectional view of a gage block showing the construction and arrangement of valves and the relative location of a pressure and a vacuum gage.

Figure 3 is a longitudinal sectional view of a valve mechanism at the end of a vacuum or pressure line adjacent the cylinder head of a combustion engine and showing schematically attachment thereto of a vacuum or pressure gage.

Figure 4 is a schematic view showing successive conditions in the combustion chamber of a combustion cylinder as the four cycles progress from a suction stroke through an exhaust stroke.

In an embodiment chosen for the purpose of illustration there is shown a combustion engine 10 having six cylinders, each provided with a spark plug 11. One of the cylinders is revealed in cut-away portion and shows a piston 12 having piston rings 13 thereon and a piston rod 14 depending therefrom. The engine includes a combustion chamber 15 for the cylinders shown located between an engine block 16 and a cylinder head 17. In this showing the spark plug for that particular cylinder has been removed.

In employing the testing method an apparatus used is shown embodied in part in a gage block 18 upon which is mounted a pressure gage 19 and a vacuum gage 20. A pressure gage connection 19′ accommodates the pressure gage 19 and a vacuum gage connection 20′ accommodates the vacuum gage 20. A flexible conduit 21 connects to a fitting 22 on the gage block at one end and to a valve fitting 23 at the other end. The valve fitting is secured in sealed relationship in a spark plug hole 24 from which the spark plug has been removed by means of a resilient sealing collar 23′.

As shown in further detail in Figure 2, the gage block 18 is somewhat elongated in its form and has a relatively short main passage 25 utilizable either as a pressure passage or a vacuum passage depending upon the manner in which the apparatus is being used. The passage 25 is directly connected to a passage 26 in the flexible conduit 21.

Extending toward the right as viewed in Figure 2 is a vacuum by-pass passage 27. This passage 27 connects directly to a valve chamber 28 at one end and the passage 25 at the other end. The valve chamber 28 contains a check valve element 29 adapted to engage a check valve seat 30 and is normally pressed thereon by operation of a spring 31. The check valve element 29 may be properly described as a pressure check valve in that it is designed to hold closed when pressure is present in the passage 25.

A plug 32 threadedly engages the upper end of the valve chamber 28 and is adapted to seal the end of the chamber by employment of a gasket 33 under the upper portion of the plug. A spring recess 34 is provided to receive the major portion of the spring 31 to provide a guide for the spring during operation of the check valve.

When the check valve is raised, the valve chamber 28 is adapted to communicate with a relatively short check valve passage 35 in axial alignment with the valve chamber 28 and an extension 36 of the vacuum by-pass passage communicates between the check valve passage 35 and a gage passage 37 which communicates with the vacuum gage 20 which is of normal conventional construction.

For venting a vacuum condition in the gage and vacuum by-pass passage extension 36 there is provided a vacuum relief valve 38 which is adapted to be manipulated manually to release communication between a vacuum relief passage 39 and the extension 36 of the vacuum by-pass passage.

A second valve chamber 40 contains a check valve element 41 adapted to engage a seat 42. A plug 43 threadedly sealed in the upper end of the valve chamber 40 contains a spring recess 44 housing a spring 45 which normally presses the valve element 41 upon its seat. This valve element may properly be described as a vacuum check valve in that it is located to seat when a vacuum condition exists in the passage 25.

When the check valve 41 is raised by the presence of a pressure condition in the passage 25, the passage 25 communicates through the valve chamber 40 with a pressure by-pass passage 46 which in turn communicates directly with a pressure gage passage 47 and thence with the pressure gage 19 which is of conventional construction.

To relieve or bleed off any accumulation of pressure condition in the passage 46 there is provided a pressure relief valve 49 adapted to be seated and unseated by manual means so as to establish and break communication between a pressure relief passage 48 and the pressure by-pass passage 46.

Under certain conditions the valve fitting 23 may be of sufficiently conventional construction to make use of a shut-off relief valve usable when either the pressure gage or the vacuum gage is employed. A valve fitting 23', however, especially well adapted for use with the vacuum gage 20, is illustrated in Figure 3 wherein a typical connection is shown to the vacuum gage.

In particular the valve fitting 23' includes a valve body 50 in which is a valve passage 51 in axial alignment with a valve chamber 52. A nipple 53 contains a passage 54 likewise in axial alignment with the valve passage 51. The nipple is provided with a sealing collar or sleeve 56 held beneath a shoulder 57 by virtue of which the valve fitting can be sealed temporarily in the spark plug hole 24.

A valve seat 58 has seated thereon a check valve element 59 spring pressed by means of a spring 60 into normal seated position. A plug 61 containing a spring recess 62 for guiding the spring 60 threadedly engages the upper end of the valve chamber 52. The plug is provided with a smooth palm-engaging surface 63 at its upper end, which surface overhangs the valve body to a slight extent.

A conventional shut-off valve 64 communicates with a bleed or relief passage 65 adapted to communicate with an outlet 66 when the shut-off valve is open.

A nipple 67 adapted to connect with a vacuum line 68 communicates with a check valve chamber 69 in which a ball check 70 is normally urged by a spring 71 against its seat. The ball check is adapted to protect the vacuum gage in the event pressure may be built up in the valve passage 51 and to open when a vacuum condition exists therein. By this means the vacuum and pressure produced may be held so it can be read on the gages by customer as well as mechanic.

For the purpose of illustration and explanation there is shown schematically in Figure 4 four different stages or conditions which are experienced in a single combustion chamber for one cycle of operation of the piston 12. As there shown an intake valve 75 and an exhaust valve 76 are shown located to establish communication with the combustion chamber 15 under different circumstances. In position No. 1 the intake valve 75 is shown open and the exhaust valve 76 is shown closed. This is the relationship of elements at and during the suction stroke which is labeled position 1. In position 2, illustrating the compression stroke, the valves are both shown in closed position. In position 3, which is the explosion or power stroke, the valves are also both shown closed. Position 4 is the exhaust stroke at which time the exhaust valve 76 is shown open and the intake valve 75 is shown closed.

In the practice of the method for which the apparatus herein described is designed, testing of the cylinder is made at position 3 which is the explosion or power stroke. During that stroke both valves are closed. When the test is to be performed, the appropriate spark plug 11 is removed and after any fuel gas has been given a chance to escape the valve fitting is temporarily sealed in the spark plug hole 24. Preparatory to employment of the gage mechanism both relief valves 38 and 49 may be opened temporarily and thereafter closed. If the vacuum gage is to be used the relief valve 49 should be left open. Thereafter the engine is turned over with the usual self-starter, or by hand if need be, and during the compression stroke immediately preceding the explosion or power stroke condition to be utilized may build up pressure in the passage 25 but this pressure is exhausted past the check valve 41 and through the passage 46 to the pressure relief passage 48. The check valve 29 during this portion of the operation will seat and prevent pressure from passing to the vacuum gage. Compression pressure has been completely released to the atmosphere. When the explosion stroke condition begins, the check valve 41 will seat and the vacuum condition set up in the passage 25 will be communicated through the vacuum by-pass passage 27 and its extension 36 and thence through the gage passage 37 to the vacuum gage. During this portion of the operation the check valve 29 will be unseated against spring pressure by the reverse pressure condition or vacuum condition. The vacuum condition in the combustion chamber 15 is therefore reflected upon and can be measured in inches by the gage 20.

Since at this stage of combustion cylinder operation the valves 75 and 76 are seated by conventional mechanisms unaided by any pressure inside of the combustion chamber, any leaky condition in either of those valves will be immediately and accurately reflected in the gage measurement of the vacuum gage 20. Unsatisfactory conditions of seating of the valves or piston rings are accurately reflected by the vacuum gage and are uninfluenced by other factors. The unsatisfactory condition need not be great to be measured inasmuch as a one-inch vacuum variation is easily detected and a variation to that extent is indicative of a condition in the combustion cylinder which should be corrected. Under ordinary conditions the vacuum gage will measure twenty-two to twenty-four inches of vacuum, but must be equal in all cylinders. If the vacuum is twenty-three inches on a given cylinder, all cylinders in that engine should be equal to within one-half inch.

Under circumstances where it might become desirable to check the condition in the combustion chamber 15 by use of a pressure gage at the compression stage of cylinder operation, the pressure gage 19 may be employed in the same general set up as herein described. When this is to be done, the vacuum relief valve 38 will be left open and the pressure relief valve 47 will be tightly closed. In the event of a suction condition in the combustion chamber immediately preceding the compression stroke, unseating of the check valve 29 will admit air through the vacuum by-pass passage and the passages 25 and 26 to the combustion chamber. As soon as the compression stroke starts, the check valve 29 will seat tightly and the pressure condition will lift the check valve 41 transmitting the pressure condition through the valve chamber 40 and pressure by-pass passage 46 to the gage passage 47 and thence to the pressure gage 19 wherein gage pressure will be measured in pounds. The pressure indicated by the gage can then be interpreted in the usual fashion to indicate conditions in the combustion cylinder which need attention.

The making of a vacuum reading for the tightness of the combustion chamber provides for a truer interpretation of the compression gage reading and makes it more understandable. Although pressure condition directly affects power, the vacuum condition directly affects the carburetion and accompanying unequal distribution of fuel mixture and therefore indirectly power.

Use of the valve fitting 23' enables pressure previously built up in the combustion chamber 15 to be positively relieved at a location close to the combustion chamber, thereby leaving no appreciable residual pressure condition in the system. As pressure is built up it is prevented by the ball check 70 from influencing the vacuum gage thereby to damage it. The pressure, however, unseats the check valve 59 and is exhausted through the shut-off valve 64 which is set in open position. When the vacuum condition prevails, the check valve 59 will seat aided by pressure of the spring 60 and the ball check 70 will unseat. The vacuum condition will thereby be immediately revealed by the vacuum gage.

It should be remembered that in the reading of vacuum pressures with the apparatus herein described accuracy in the reading is of essential importance. It is also necessary as a practical matter that the apparatus be one capable of a quick set-up and removal from one combustion chamber to another. Consequently the nipple, or whatever it may be which is selected to make the connection from the gage apparatus to the spark plug hole, best accomplishes the purpose when it can be pressed into position with a sufficiently tight seal to be pressure proof and which at the same time can be quickly removed. Hence a pressure sealing collar like the collar 56 is advantageous since it does not need to be screwed into the threads in the spark plug hole. To effectively seal it, however, some pressure needs to be exerted. Hence there is provided the smooth palm-engaging surface 63 extending over the entire area of the fitting at a location axially disposed with respect to the axis of the spark plug hole whereby the operator can press with his palm with sufficient force against the fitting to seal the connection tight for as long as it takes to read the vacuum or pressure gage indicator.

There has been accordingly described herein a simple, practical, quick operating gage mechanism so constructed that gages can be accurately read, whether vacuum gages or pressure gages, and further so constructed that the switch can be made rapidly from one to the other without the hazard of damaging either gage by improper adjustment of the mechanism. The apparatus moreover permits a new method of testing combustion cylinders quickly, efficiently and economically and with a greater degree of accuracy than any heretofore employed.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. A method of testing tightness of cylinders in combustion engines having a crank shaft, an ignition system, a combustion chamber in the engine including an ignition aperture, intake and exhaust valves and a piston mounted for reciprocating motion in the chamber for movement successively in normal operation through suction, compression, explosion and exhaust strokes, said method comprising removing the ignition element from the ignition aperture applying a vacuum gage to the ignition aperture with the ignition turned off, turning said engine by application of exterior mechanical force to the crank shaft to initial position of the piston prior to the explosion stroke, relieving all pressure at said initial position, moving said piston through the explosion stroke and measuring the minimum pressure present during said explosion stroke.

2. A method of testing tightness of cylinders in self-starting combustion engines wherein a combustion chamber in the engine includes an ignition system, an ignition aperture and an ignition element therefor, intake and exhaust valves and a piston mounted for reciprocating motion in the chamber for movement successively in normal operation through suction, compression, explosion and exhaust strokes, said method comprising removing said ignition element from the ignition aperture to relieve the chamber of fuel vapor, sealing a minimum reading vacuum gage system including a vacuum gage in the aperture, turning said engine by operation of the self-starter to initial position of the piston prior to the explosion stroke, relieving all pressure at said initial position, moving said piston through the explosion stroke and measuring the minimum pressure present during said explosion stroke.

3. A measuring system for the detection of tightness in valves, rings and combustion chamber in combustion engines having an ignition aperture into said chamber comprising a connection for said aperture, a fluid line attached at one end to the connection, a gage block having a connection to the fluid line at the other end and a main passage at said last connection, said block having a pressure by-pass passage and a vacuum by-pass passage connected to the main passage, a vacuum gage at the other end of the vacuum by-pass passage, a vacuum closing check valve in the pressure by-pass passage, and a pressure closing check valve in the vacuum by-pass passage.

4. A measuring system for the detection of tightness in valves, rings and combustion chamber in combustion engines having an ignition aperture into said chamber comprising a connection for insertion into said aperture, a fluid line attached at one end to the connection, a gage block having a connection to the fluid line at the other end, said block having a pressure by-pass passage and a vacuum by-pass passage connected at one end of each to the vacuum line passage, a pressure gage at the other end of the pressure by-pass passage and a vacuum gage at the other end of the vacuum by-pass passage, a vacuum closing check valve in the pressure by-pass passage, and a pressure closing check valve in the vacuum by-pass passage.

5. A measuring system for the detection of tightness in valves, rings and combustion chamber in combustion engines having an ignition aperture into said chamber comprising a manual sealing connection for insertion into said aperture, a fluid line attached at one end to the connection, a gage block having a connection to the fluid line at the other end and a main passage at said last connection, said block having a pressure by-pass passage and a vacuum by-pass passage connected at one end of each to the main passage, a pressure gage at the other end of the pressure by-pass passage and a vacuum gage at the other end of the vacuum by-pass passage, a vacuum closing check valve in the pressure by-pass passage, and a pressure closing check valve in the vacuum by-pass passage.

6. A measuring system for the detection of tightness in valves, rings and combustion chamber in combustion engines having an ignition aperture into said chamber comprising a manual sealing connection for insertion into said aperture, a fluid line attached at one end to the connection, a gage block having a connection to the line at the other end and a main passage at said last connection, said block having a pressure by-pass passage and a vacuum by-pass passage connected at one end of each to the main passage, a maximum reading pressure gage system including a gage at the other end of the pressure by-pass passage and a minimum reading vacuum gage system including a gage at the other end of the vacuum by-pass passage, a vacuum closing check valve in the pressure by-pass passage, a pressure closing check valve in the vacuum by-pass passage, a manually operated bleed valve in each said by-pass passage, and an auxiliary automatic pressure relief check and shut-off valve device at the manual sealing connection.

7. A measuring system for the detection of tightness in valves, rings and combustion chamber area in combustion engines having an ignition aperture into said chamber comprising a valve body having a main valve chamber therein, connection means on the body connecting with the chamber having a resilient collar adapted to seal in the ignition aperture, a fluid line connection to the body having a check valve therein biased to seal against pressure in said main valve chamber and a vacuum gage connected to said fluid line connection, said body having a pressure release check valve chamber in alignment with said connection means and a valve seat between said chambers, a check valve element adapted to engage said seat, and means normally urging said pressure release check valve element to closed position.

8. A measuring system for the detection of tightness in valves, rings and combustion chamber area in combustion engines having an ignition aperture into said chamber comprising a valve body having a main valve chamber therein, a nipple on the body connecting with the main valve chamber and having a resilient collar adapted to seal in the ignition aperture under manual pressure, a fluid line connection at one side of the body having a check valve therein biased to seal against pressure in said main valve chamber and a vacuum gage connected to said fluid line connection, said body having a check valve chamber in axial alignment with said nipple and a valve seat between said chambers, a pressure release check valve element adapted to engage said seat, a hand contacting plug threadedly mounted in the check valve chamber, a spring between the plug and the pressure release check valve element normally urging said last check valve element to closed position and adapted to be adjusted by said plug, a palm engaging surface at the outer end of said plug and a manual shut-off valve connected between the side of said check valve chamber and the atmosphere.

9. A measuring system for the detection of tightness of valves, rings and combustion chamber in combustion engines having an ignition aperture into said chamber comprising, a gas pressure diverter including a body having a passageway therein, a connection on said body, a resilient annular adapter adapted for sealed insertion in said ignition aperture, said connection having an inlet passage in communication with said passageway, a gage connection on said body, a gage communicating with said connection and a flexible passageway forming part of a composite communication line between said adapter and said gage, a check valve in said composite communication line positioned to close under positive pressures exceeding atmospheric pressure exerted in a direction toward said gage and adapted to open under pressures less than atmospheric pressure in an opposite direction, means in said body forming a pressure outlet passage communicating with the atmosphere, and a release valve in said outlet passage positioned to release pressure in said passageway to the atmosphere.

10. A method of testing tightness of individual cylinders in a combustion engine of rated vacuum and pressure characteristics and possessed of a crank shaft, an ignition system, an ignition aperture for each cylinder, intake and exhaust valves and a piston mounted for motion in the cylinder for movement successively in normal operation through suction, compression, explosion and exhaust strokes, said method comprising removing the ignition elements, relieving a selected cylinder of fuel vapor, sealing a minimum reading vacuum gage system including a vacuum gage in the aperture, turning said engine through at least one operation cycle by application of a rotative force to the crank shaft, relieving all pressure and measuring the vacuum condition of the selected cylinder with both valves seated, then measuring the pressure condition of said selected cylinder with both valves seated and determining the differences respectively between rated and measured vacuum conditions and between rated and measured pressure conditions.

References Cited in the file of this patent

UNITED STATES PATENTS

| | | |
|---|---|---|
| 1,462,109 | Hopkins | July 17, 1923 |
| 1,874,694 | Broce | Aug. 30, 1932 |
| 2,122,243 | Bonhard | June 28, 1938 |
| 2,362,446 | Bodine | Nov. 14, 1944 |
| 2,620,656 | Peterson | Dec. 9, 1952 |
| 2,625,033 | Adair | Jan. 13, 1953 |
| 2,646,683 | Pickron | July 28, 1953 |